April 26, 1960  G. F. STETZLER  2,934,705
TESTING APPARATUS
Filed Sept. 25, 1957
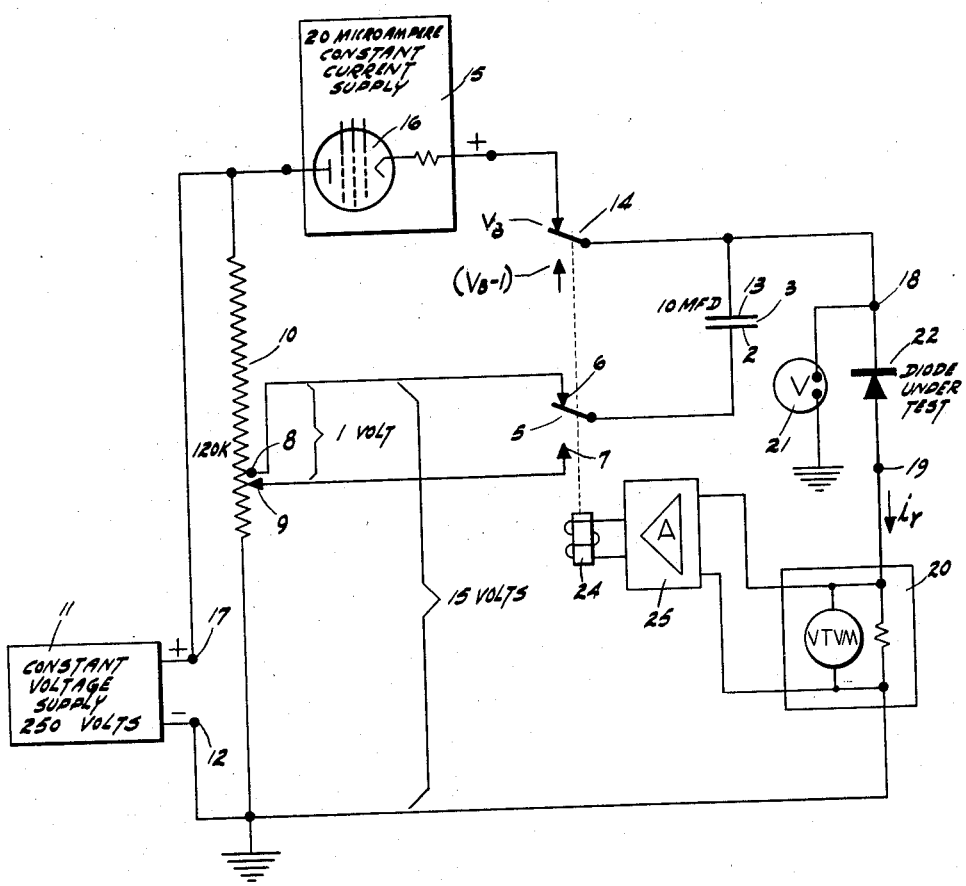
INVENTOR
G. F. STETZLER
By W. C. Parnell
ATTORNEY

United States Patent Office 2,934,705
Patented Apr. 26, 1960

2,934,705
TESTING APPARATUS

Grant F. Stetzler, Temple, Pa., assignor to Western Electric Company, Incorporated, New York, N.Y., a corporation of New York Application September 25, 1957, Serial No. 686,121

4 Claims. (Cl. 324—158)

This invention relates to testing apparatus and particularly to apparatus for testing electrical characteristics of asymmetrically conducting devices.

Commercially manufactured varistors and diodes are less uniform than many other circuit elements and required uniformity is generally obtained by special selection. Variations in zener or avalanche breakdown voltages between units complicate production testing thereof, particularly in the case of p-n junction type diodes where the reverse leakage current must be determined. The reverse leakage current of a semiconductor diode, a figure of merit therefor, is its current for a reverse direction bias at a potential of a specified value below its zener voltage value. For example, diodes having zener voltages in the order of twenty volts are tested at one volt below their respective zener breakdown values. Due to the non-uniformity of the zener points of successive units to be tested, the specific potentials applied for this test vary accordingly, and are not known until the particular zener voltage is determined.

The main object of this invention is to simplify the testing of such non-uniform diodes.

In accordance with this object, the reverse leakage current of a unit under test is measured at a prescribed potential less than the particular zener breakdown voltage of the unit by subjecting a serially connected source of biasing potential and a large condenser to the breakdown potential and utilizing the charge of this condenser, in conjunction with a reduction by said prescribed amount in the output of the biasing source to maintain the required reduced reference potential for the particular unit under test while the value of the current is determined.

In a preferred embodiment of the invention, which may be utilized to measure zener values as well as the reverse leakage currents of diodes, the total potential across the condenser and a serially connected source of potential is built up by charging the condenser with a controlled charging current, supplied from a constant current supply, until the total series potential reaches the zener breakdown value of a diode connected in shunt therewith. The charging current is then removed and the output potential of the source is reduced by a fixed amount so that the series arrangement presents the correct reference potential for performing the reverse-leakage-current test. For this test the capacitor acts as a memory device and, together with the reduced output potential of the supply, serves as a constant potential source which is automatically adjusted to the required potential value for the particular diode under test.

These and other features of the invention will be more fully understood when taken in conjunction with the single figure of the drawing showing a schematic circuit diagram of the invention.

With the circuit shown in the drawing, the zener breakdown voltage of a diode under test is determined and remembered. Then the remembered breakdown potential is reduced by the amount prescribed for the reverse-leakage-current test to permit measuring the current at the correct reference potential. This particular embodiment of the invention was designed for testing silicon alloy p-n junction type diodes such as the Western Electric Company 420 type having zener breakdown voltages in the range between fifteen and thirty volts.

One electrode 2 of a ten microfarad condenser 3 is biased to one or another fixed potential through a two-position switch 5, whose contacts 6 and 7 are connected to a fixed and an adjustable output connection 8 and 9, respectively, of a 120,000 ohm voltage divider 10. The voltage divider 10 is energized by a 250 volt constant potential supply 11, whose negative polarity output terminal 12 is connected to ground potential. The other condenser electrode 13 is connected through a switch 14, ganged for simultaneous operation with switch 5, to a twenty microampere constant current supply 15. The supply 15 utilizes a pentode 16 in its output circuit whose plate electrode is connected to the positive polarity output terminal 17 of the supply 11. The condenser electrode 13 is also connected directly to one of the test terminals 18, the other test terminal 19 being connected to the ground potential side of the voltage divider 10 through a low resistance impedance element of a conventional vacuum tube voltmeter type current measuring device 20. A voltmeter 21 is connected across the test terminals 18 and ground potential for indicating the zener breakdown voltage of a unit 22 connected thereto, the voltage drop across device 20 being negligible. Diodes to be tested are connected in their reverse direction with respect to the polarity of the condenser charging current provided by the supply 15.

For testing diodes having a zener breakdown voltage within the above stated range, the reverse leakage current test is made by measuring a current in the diode with a potential of one volt less than the breakdown value ($V_b-1$) applied thereto. With such a test requirement, the adjustable voltage divider connection 9 is set such that the potential between it and ground potential is one volt less than that between the fixed connection 8 and ground potential. The fixed output connection 8 of the divider applies a fifteen-volt bias to the capacitor electrode 2 when the switches 5 and 14 are in their normal "$V_b$" position, at which time the constant current supply charges the capacitor at a twenty-microampere rate until the potential across the series arrangement of the capacitor and the voltage divider reaches the breakdown potential of the diode 22 under test. When the zener value is reached, the impedance of the diode is sharply decreased (for example, from twenty megohms to one megohm) and current flows through the diode in its reverse direction, the condenser offering a substantially infinite impedance as compared to the reduced breakdown impedance of the diode. The zener value then is indicated on meter 21 when the current "$i_r$" (which may be detected on the current measuring device 20) makes a sharp increase. The switches 14 and 5 are thrown to their reverse leakage current test position "$V_b-1$" when the zener voltage is reached, whereupon the constant current supply 15 is disconnected from the diode and the output voltage of the divider 10 biasing the electrode 2 of the capacitor is reduced by one volt. The effect of the switching of the potential output of the voltage divider 10 is to reduce the potential across the diode under test by one volt under its zener breakdown value. The impedance of the diode under test at this reduced potential should be greater than 20 megohms; consequently, at this high impedance the leakage current is extremely small (i.e., less than one microampere). Consequently, the drain on the capacitor 3 is negligible during the time required to obtain the measurement. In order to minimize the discharging of the capacitor, the low side of the capacitor is initially biased to a value slightly less than the lowest zener breakdown voltage value for the diodes to be tested. In this way the potential across the diode is kept constant as long as possible when the supply 15 is disconnected therefrom and the leakage current measurements are made. This is possible because the capacitor is charged with only a relatively small portion of the total zener breakdown voltage. For example, a diode having a zener voltage of twenty would cause the capacitor to be charged to five volts while if the bias voltage were in the order of one or two volts, the capacitor would be charged to 19 or 18 volts.

With this test apparatus then, when the switches 14 and 5 are in their breakdown voltage position, the zener voltage may be read directly from the voltmeter 21 and when the switches are thrown to the other ($V_b-1$) position, the leakage current may be read directly without making any manual adjustments. It is to be noted that the impedance of the diode 22 under test is extremely high for voltages under the zener value; consequently, the small resistance in series therewith in the current measuring device 20 is negligible.

In the event that automatic switching is desired, a predetermined value of diode current "$i_r$" may be utilized to trigger an actuator 24. In such an arrangement it is necessary to utilize an amplifier 25 which isolates the actuator 24 from the diode circuit and provides the necessary power to energize the actuator.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. Apparatus for testing the electrical characteristics of asymmetrical conducting devices comprising a condenser, a source of direct current biasing potential in series with the condenser, means for connecting a unit to be tested in shunt with the condenser and the biasing source, means for charging the condenser to subject the unit to a required potential difference, means for disconnecting the charging means, means for reducing, by a predetermined amount, the value of the biasing potential supplied to the charged condenser so that the biased charged condenser produces a desired reference potential across the unit, lower than said required potential, when the required potential difference across the unit is reached and the charging means is disconnected, and means for measuring the current in the unit.

2. Apparatus for testing the reverse leakage current of diodes, comprising a condenser, a source of charging current for the condenser, a source of biasing potential in series with the condenser, means for connecting a unit to be tested in shunt with the condenser and the biasing source, switching means for connecting the charging current source to the condenser to charge it to increase the potential across a unit under test up to its zener value, means for reducing the biasing potential by a predetermined amount, means operative when the zener value is reached for actuating the biasing potential reducing means and the switching means to disconnect the charging source and reduce the potential across the unit to a desired reference potential, and means for measuring the current in the unit.

3. In apparatus for testing the electrical characteristics of asymmetrically conducting devices, a condenser, a power supply having two outputs of substantially constant potentials, said potentials differing by a prescribed amount, switching means for selectively connecting the condenser in series with either one of the outputs, a pair of test terminals for connecting a unit to be tested in shunt with the serially connected condenser and either one of the outputs, a controlled-current power supply for charging the condenser until the total potential across the unit under test reaches a required value with the switching means actuated to connect the higher of the two outputs to the condenser, means for disconnecting the controlled-current power supply from the condenser when the switching means is actuated to connect the lower of the two outputs to the condenser, and means for measuring the current in the unit.

4. Apparatus for testing voltage-current characteristics of semiconductor diodes, comprising a condenser, a supply of substantially constant potential, a voltage divider connected across the supply, said divider having two outputs of different potentials, means for serially connecting the higher of said potentials with one side of the condenser, switching means operable to disconnect the higher and to connect the lower divider potential to said one side of the condenser, a pair of test terminals for connecting a unit to be tested in shunt with the serially connected condenser and either one of the outputs, a controlled-current power supply connected to the other side of the condenser, switching means, operable simultaneously with the first mentioned switching means, operable to disconnect the controlled-current supply from the capacitor, and means responsive to current in a unit under test for simultaneously operating the switching means when the potential across the unit reaches the zener breakdown value, a voltmeter connected across the test terminals, and means for measuring current in a unit under test.

References Cited in the file of this patent

FOREIGN PATENTS 865,159     Germany _____ Jan. 29, 1953

OTHER REFERENCES

"Selenium Rectifier Testing," Electronic Technician, February 1957, pages 32 and 33.